United States Patent
Dai et al.

[19]

[11] Patent Number: 5,878,714
[45] Date of Patent: Mar. 9, 1999

[54] TURBULENCE GENERATION WITH INTRA-CYCLE COOLING FOR SPARK IGNITION ENGINES

[75] Inventors: Wengang Dai, Canton; George Carver Davis, Ypsilanti; Michael Moses Schechter, Farmington Hills, all of Mich.

[73] Assignee: Ford Global Technologies, Inc., Dearborn, Mich.

[21] Appl. No.: 927,869

[22] Filed: Sep. 10, 1997

[51] Int. Cl.$^6$ ............................ F02D 15/04; F02D 13/02
[52] U.S. Cl. ............................................................ 123/316
[58] Field of Search ........................... 123/48 D, 78 D, 123/90.11, 90.12, 90.15, 316

[56] References Cited

U.S. PATENT DOCUMENTS

| | | | |
|---|---|---|---|
| 1,648,929 | 11/1927 | Zaikowsky | 123/316 |
| 3,127,878 | 4/1964 | Leunig et al. | 123/263 |
| 4,210,105 | 7/1980 | Nohira et al. | 123/277 |
| 4,700,684 | 10/1987 | Pischinger et al. | 123/568 |
| 4,722,315 | 2/1988 | Pickel | 123/568 |
| 4,945,870 | 8/1990 | Richeson | 123/90.11 |
| 5,178,109 | 1/1993 | Kawamura | 123/292 |
| 5,201,907 | 4/1993 | Hitomi et al. | 123/48 D |
| 5,233,948 | 8/1993 | Boggs et al. | 123/64 |
| 5,255,637 | 10/1993 | Schechter | 123/48 R |
| 5,255,641 | 10/1993 | Schechter | 123/90.12 X |
| 5,419,301 | 5/1995 | Schechter | 123/673 |
| 5,730,091 | 3/1998 | Diehl et al. | 123/90.11 |

FOREIGN PATENT DOCUMENTS 0 438 252 A1  1/1991  European Pat. Off. .

*Primary Examiner*—Tony M. Argenbright
*Attorney, Agent, or Firm*—Donald A. Wilkinson

[57] ABSTRACT

A four stroke, spark ignition, high compression ratio, internal combustion engine including at least one intake valve (30), exhaust valve (32) and charging valve (36) per cylinder (16). Each of the valves is actuable by a variable timing mechanism (50), which is controlled by an on-board computer (82) that varies the timing of valve opening and closing depending upon engine operating conditions. Each charging valve port (34) leads to an auxiliary chamber (40) having geometry to cause a swirling motion of the charge entering the chamber and surrounded by a cooling jacket (42) to cool the charge as it swirls before being released back into the cylinder during the next engine cycle.

19 Claims, 3 Drawing Sheets

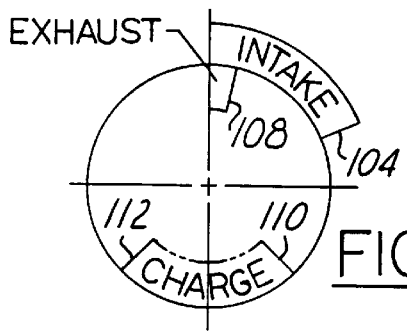
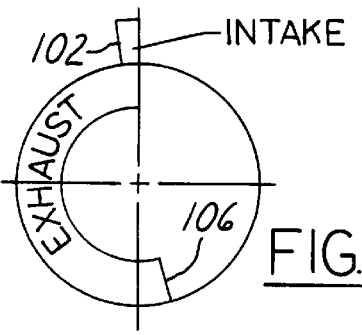
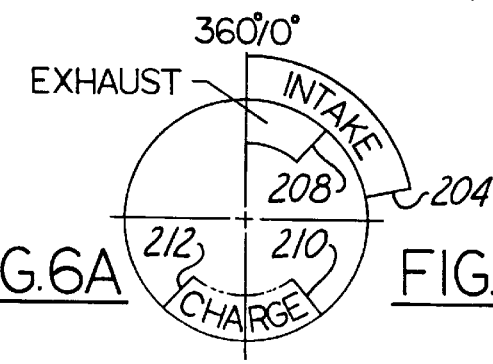
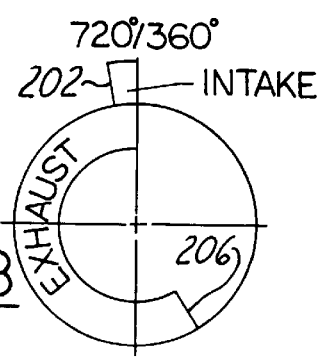
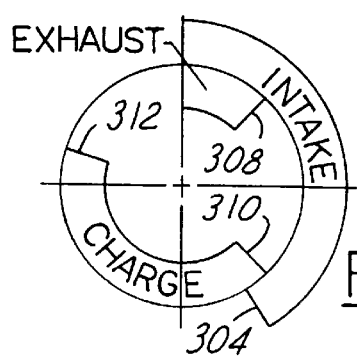
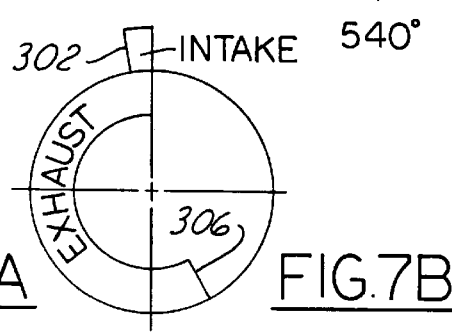
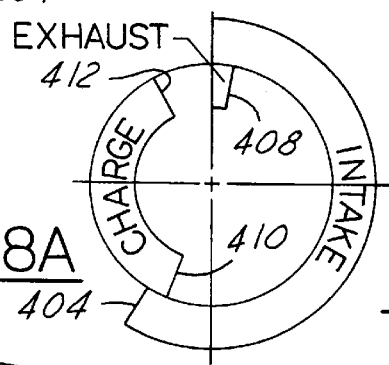
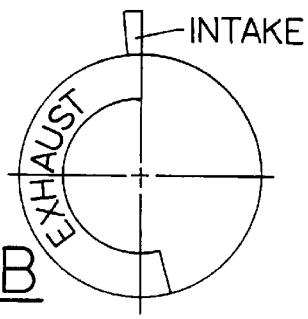
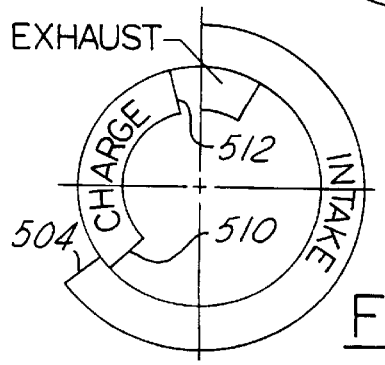
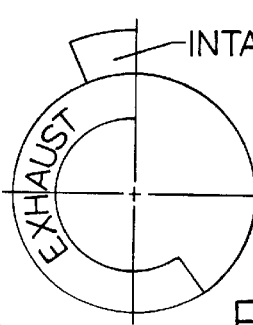

TURBULENCE GENERATION WITH INTRA-CYCLE COOLING FOR SPARK IGNITION ENGINES

FIELD OF THE INVENTION

The present invention relates to a spark ignition, four stroke, internal combustion engine and more particularly to a system for flow control into and out of the cylinders for this engine.

BACKGROUND OF THE INVENTION

Conventional spark ignition, four stroke, internal combustion engines generally operate with intake and exhaust valves in each cylinder actuated with a fixed timing relative to an engine crankshaft, and with a throttle valve upstream of the intake valves to control the engine load by throttling the air flow. Further, the compression ratio of each cylinder is fixed regardless of engine speed. This basic configuration, consequently, has drawbacks that limit the efficiency of the engine for most operating conditions, which others have tried to overcome.

One drawback is that the load is controlled by throttling the air past the throttle valve in order to operate at other than full load conditions. This, along with other restrictions of the air flow, creates pumping losses in the engine. One attempt to overcome the pumping losses is to provide for variably actuated intake and exhaust valves that allow for control of the intake flow, and hence load control, by varying the opening and closing of the valves rather than employing a throttle valve. This does reduce the pumping losses and gives greater control of engine operation over a wider range of engine operating conditions. However, this solution is limited by the fact that controlling the intake of the air/fuel mixture at low load and idle conditions will substantially reduce the compression ratio at those conditions, resulting in poor combustion characteristics for these load conditions. One solution, then, is to increase the compression ratio for each cylinder in the engine at low load conditions. One such attempt has been to provide a variable compression ratio assembly where adjustments are made to the piston travel or the cylinder volume to allow for an overall higher compression ratio, while at high loads reducing the compression ratio to avoid knock. These solutions, however, add great cost and complexity to the overall engine. Further, one of the main disadvantages of spark ignition engines relative to other known engines, such as diesel, are their inability to operate with a high compression ratio. Generally, spark ignition engines (Otto cycle engines) with higher compression ratios are more efficient, thus improving fuel economy. To prevent knock in a spark ignition engine, its compression ratio must be restricted to much lower values than those used in other engines such as diesels, and this is an important factor contributing to its lower fuel efficiency relative to diesel. Thus, by permitting the spark ignition engine to operate with a high compression ratio without knock, it can substantially increase the engine efficiency.

Generally, then, a fixed compression ratio is the economical way to design an engine. For an engine, nonetheless, the compression ratio has to be held below an upper limit at heavy load conditions to prevent knocking. Consequently, it operates at this low compression ratio condition even for low and medium load conditions where knocking is not a concern and a higher compression ratio would operate more efficiently. Further, this limits the ability to operate without throttling the air flow.

The reason for the knock at full-load conditions is that the amount of combustion generated heat is great, which in turn, leads to an excessive temperature of the unburned gas fraction in the cylinder and hence the onset of knock. This puts a limit on the total amount of heat that can be transferred to the cylinder charge at a given engine speed during compression and combustion. At part-load, when the amount of combustion heat is relatively small, the engine could run knock-free with high compression ratio.

A further attempt to overcome the obstacles to maximizing engine efficiency relates to the flow characteristics for the air/fuel entering the cylinder. Less than ideal fluid flow and mixing will result in less than complete combustion, slow flame speed and burn rate, or both. Turbulence has been recognized as a primary driving force for good combustion in spark ignition engines. The practical and effective ways to increase turbulence production during combustion processes have been through the swirl- and tumble-generation devices. Split (dual) intake ports is an example of swirl-generating devices and tumble port used in four-valve engines is an example of tumble-generating device. Some have attempted to improve the flow characteristics by the geometry of the intake ports, employing vanes, or masking in order to improve mixing and create a swirl or tumble flow within the cylinder. However, these types of arrangements generally create flow restrictions, thus restricting and consequently limiting the maximum amount of flow into the cylinder and thus limiting the maximum engine output. Further, they are expensive to develop and produce. Thus, an inexpensive and reliable means for creating turbulence is desired that does not create flow restrictions.

Attempts have been made to overcome some of the above noted obstacles to maximum engine efficiency, but none satisfactorily improves most or all of these limitations of the conventional four stroke, spark ignition engine.

SUMMARY OF THE INVENTION

In its embodiments, the present invention contemplates a four stroke, spark ignition engine. The engine comprises a cylinder block provided with at least one cylinder therein and a head, mounted to the cylinder block, including for each respective cylinder an intake port, an exhaust port and a charging port in communication with the cylinder. A piston operatively engages the at least one cylinder, with the piston to cylinder and head relationship being such that a high compression ratio within the cylinder will be achieved during engine operation. An intake valve is provided for each intake port, operatively engaging the respective intake port; an exhaust valve for each exhaust port, operatively engaging the respective exhaust port; and a charging valve for each charging port, operatively engaging the respective charging port. An auxiliary housing includes a main chamber enclosed therein and an opening from the main chamber in communication with the charging port, with the main chamber shaped in a generally circular shape and the opening being offset from a central portion of the main chamber whereby fluid entering the chamber will be caused to swirl about the chamber, and with the auxiliary housing also including a cooling jacket surrounding a portion of the main chamber. Valve actuating means are provided for selectively and variably actuating the intake valve and the exhaust valve in timed relation to engine operation, and charging valve actuating means are provided for selectively and variably actuating the charging valve in timed relation to engine operation.

Accordingly, an object of the present invention is to improve the efficiency of a spark ignition, four stroke, internal combustion engine by controlling the flow into the cylinder by variable engine valve timing rather than air throttling, while also providing a higher compression ratio to account for this type of flow control by reducing the temperature of the combustion mixture in the cylinder at least under high load conditions to thereby reduce the likelihood of creating unwanted engine knock.

A further object of the present invention is to achieve the above noted object while also creating turbulence in the fluid within the cylinder to provide for increased flame speed and burn rate, thus further improving the efficiency of the engine without the need for additional flow restricting means employed in the intake ports to the cylinders that typically provide swirl, tumble or turbulence.

An advantage of the present invention is that fast combustion and higher power output (higher volumetric efficiency) is achieved without employing the high cost of swirl, tumble and other turbulence generation devices, which restrict the flow into the cylinder.

A further advantage of the present invention is that a turbulence generation chamber, combined with intra-cycle chamber cooling, is used on a high compression ratio engine to increase fuel efficiency while minimizing cost of the overall system by performing both functions with one chamber. By combining variable valve timing from a variable valve timing system with the turbulence generation and intra-cycle cooling, the chamber can be used effectively to even further increase engine fuel efficiency.

BRIEF DESCRIPTION OF THE DRAWINGS

FIGS. 5A and 5B are schematic diagrams illustrating engine valve timing for an idle engine operating condition in accordance with the present invention;

FIGS. 6A and 6B are similar to FIGS. 5A and 5B, illustrating a light load engine operating condition;

FIGS. 7A and 7B are similar to FIGS. 5A and 5B, illustrating a medium load engine operating condition;

FIGS. 8A and 8B are similar to FIGS. 5A and 5B, Illustrating a heavy load, low speed engine operating condition; and FIGS. 9A and 9B are similar to FIGS. 5A and 5B, illustrating a heavy load, high speed engine operating condition.

DETAILED DESCRIPTION OF THE PREFERRED EMBODIMENTS

Figure 1:
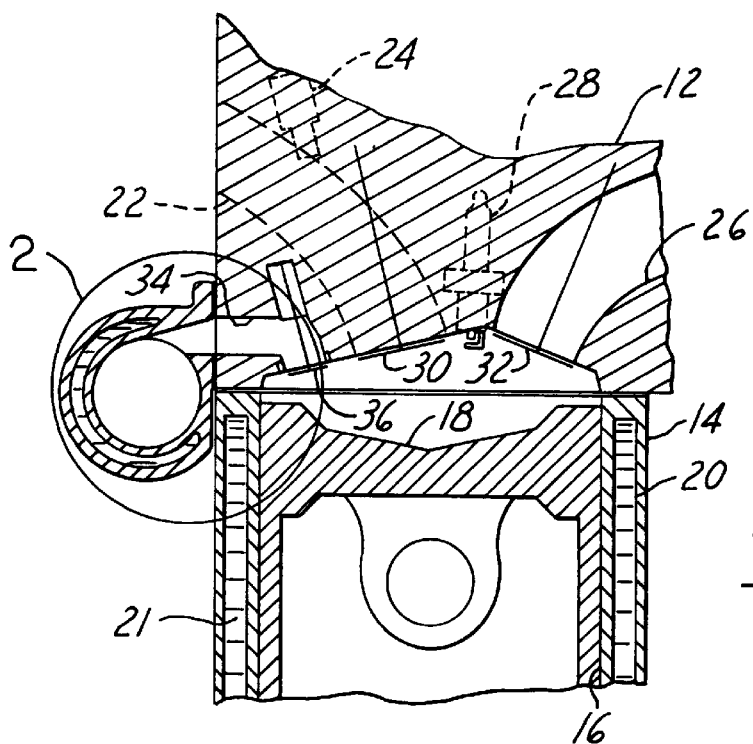
FIG. 1 is a schematic, cross-sectional side view of a cylinder and head arrangement in an engine taken along line 1—1 in FIG. 3, in accordance with the present invention.
Figure 2:
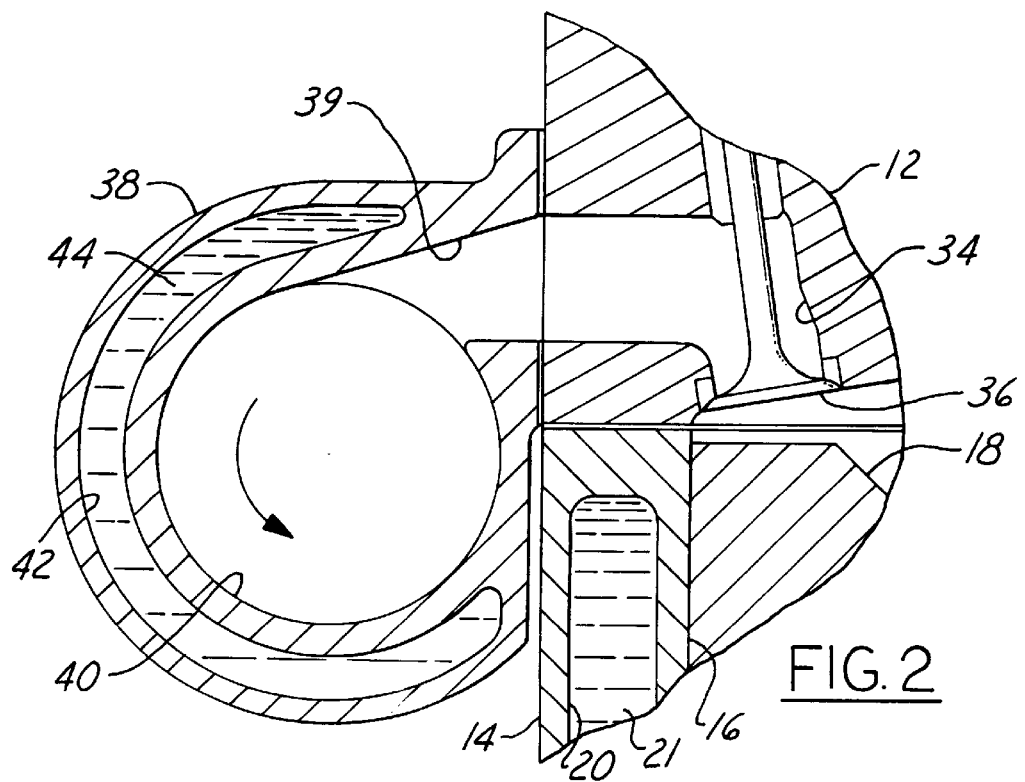
FIG. 2 is an enlarged view taken from encircled area 2 in FIG. 1.
Figure 3:
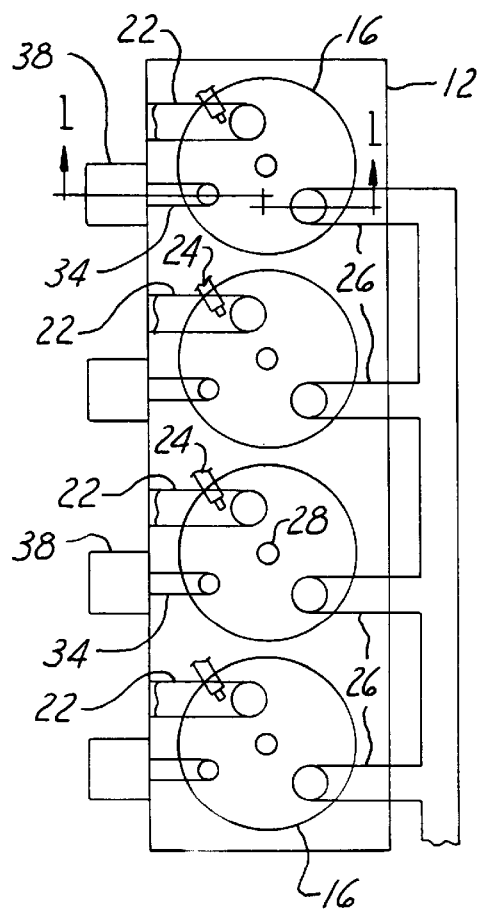
FIG. 3 is a schematic plan view of a four cylinder engine in accordance with the present invention.

FIGS. 1–3 illustrate an embodiment of the present invention in which a cylinder head 12 is mounted on a cylinder block 14. The cylinder block includes four conventional cylinders 16 with pistons 18 mounted therein, and associated water jackets 20 filled with conventional coolant 21. While this embodiment illustrates a four cylinder in-line engine, of course the present invention applies to engines of various configurations and numbers of cylinders. The configuration of each piston 18, cylinder 16 and head 12 is such that a high compression ratio occurs during engine operation. A high compression ratio engine is one in which the compression ratio reaches somewhere in the range of 10–15:1 on regular octane fuel used for light vehicles, rather than a conventional engine employed in these vehicles operating at 9–10:1.

The cylinder head 12 includes air intake ports 22 leading into each of the cylinders 16, with fuel injectors 24 mounted therein, and exhaust ports 26 leading from the cylinders 16. Four conventional spark plugs 28 are mounted in the cylinder head 12. An intake valve 30 is mounted in each intake port 22 and an exhaust valve 32 is mounted in each exhaust port 26 for selectively blocking the flow through the respective ports.

In addition, the cylinder head includes four charging valve ports 34, one aligned with each cylinder 16. A charging valve 36 is mounted in each charging valve port 34 for selectively blocking the flow therethrough in a manner similar to the intake and exhaust valves. Each of the charging valve ports 34 leads to an inlet 39 of a respective one of four auxiliary chambers 40 contained within auxiliary housings 38. Each of the auxiliary housings 38 is mounted to the cylinder head 12, and includes a cooling jacket 42 surrounding a portion of the corresponding auxiliary chamber 40. The cooling jackets 42 contain a liquid coolant 44 similar to that in the water jackets 20, and in fact can be drawn from the same cooling system if so desired. The auxiliary chambers 40 are cylindrical in shape with the inlet 39 directing any flow into the chambers 40 off center about the cylinder axis in order to create a swirling motion of the fluid within the chambers 40.

Each of the cylinders 16, then, includes at least three valves for controlling the flow of gasses in each cylinder 16. Preferably, these valves have variable timing capability to allow for maximum engine efficiency for varying speed and load conditions.

Figure 4:
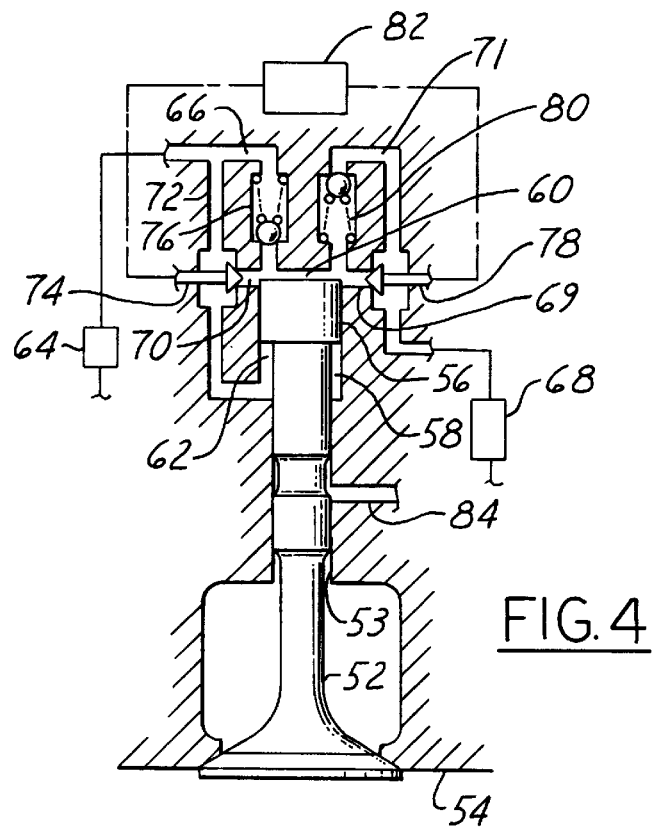
FIG. 4 is a schematic diagram illustrating a single electrohydraulically controlled engine valve, which is an example of an engine valve useable with the present invention.

FIG. 4 illustrates an example of a variable engine valve assembly 50 for a single valve of an electrohydraulic valvetrain. An electrohydraulic valvetrain is disclosed in U.S. Pat. No. 5,255,641 to Schechter, which is incorporated herein by reference. This engine valve assembly may be employed for the intake valve 30, exhaust valve 32 and/or charging valve 36 as illustrated in FIGS. 1–3.

The valve assembly is as follows. An engine valve 52, for inlet air, exhaust gas, or air charging, as the case may be, is located within a sleeve 53 in a cylinder head 54. A valve piston 56, fixed to the top of the engine valve 52, is slidable within the limits of a piston chamber 58. The pressure surface area above the piston 56, in an upper volume 60, is larger than the pressure area below it, in a lower volume 62.

Hydraulic fluid is selectively supplied to the upper volume 60 through a high pressure port 70 via a high pressure hydraulic line 72, and communicates through a low pressure port 69 via a low pressure line 71. The upper volume 60 is also selectively connected to a high pressure fluid reservoir 64 through a high pressure check valve 76 via high pressure line 66, or to a low pressure fluid reservoir 68 through a low pressure check valve 80 via low pressure lines 71. The lower volume 62 is always -connected to the high pressure reservoir 64. A high pressure solenoid valve 74 and a low pressure solenoid valve 78 selectively restrict flow between the high pressure reservoir 64 and low pressure reservoir 68, respectively, and the upper volume 60. The high pressure solenoid valve 74 and low pressure solenoid valve 78 are activated and deactivated by signal from an on-board computer 82.

In order to effectuate the engine valve opening and closing, a predetermined high pressure must be maintained in the high pressure line 66, and a predetermined low pressure, relative to the high pressure, must be maintained in the low pressure line 71. The preferred hydraulic fluid is oil, although other fluids can be used rather than oil.

For this valve assembly, the valvetrain consumes oil from the high pressure reservoir 64, and most of it is returned to the high pressure reservoir 64. The net flow of fluid from the high pressure reservoir 64 into the low pressure reservoir 68 largely determines the loss of hydraulic energy in the system. A small additional loss is associate with leakage though the clearance between the valve 52 and its sleeve 53. A fluid return line 84 provides a route for returning any fluid that leaks out back to the system.

During engine valve opening, the high pressure solenoid valve 74 opens and the net pressure force acting on the piston 56 accelerates the engine valve 52 downward. When the high pressure solenoid valve 74 closes, pressure above the piston 56 drops, and the piston 56 decelerates pushing the fluid from the lower volume 62 back into the high pressure reservoir 64. The low pressure fluid flowing through the low pressure check valve 80 prevents void formation in the upper volume 60 during deceleration. When the downward motion of the engine valve 52 stops, the low pressure check valve 80 closes and the engine valve 52 remains locked in its open position.

The process of valve closing is similar, in principle, to that of valve opening. The low pressure solenoid valve 78 opens, causing the pressure above the piston 56 to drop. The net pressure force acting on the piston 56 now accelerates the engine valve 52 upward. When the low pressure solenoid valve 78 closes, the pressure above the piston 56 rises, and the piston 56 decelerates, pushing the fluid from the upper volume 60 through the high pressure check valve 76 back into the high pressure reservoir 64. In this way, the on-board computer 82, which controls the solenoid valves, can vary the valve timing greatly to accommodate engine operating conditions.

As an alternative to the engine valve illustrated in FIG. 4, an electronically controlled valve such as is described in U.S. patent application Ser. No. 08/746,593, assigned to the assignee of the present invention, can be employed, and is incorporated herein by reference.

FIGS. 5A–9B illustrate timing diagrams for valve lift (intake, exhaust and charging) in a four stroke engine, in accordance with the engine configuration discussed relative to FIGS. 1–3. For these FIGS., as with a conventional four stroke engine, the timing is referenced in conventional terms of degrees of crankshaft rotation. The timing of 0°–180° is referred to as the intake stroke, and 180°–360° is referred to as the compression stroke, which are illustrated in the FIGS. Marked "A". The timing of 360°–540° is referred to as the combustion stroke and 540°–720° is referred to as the exhaust stroke, which are illustrated in the FIGS. Marked "B". Bottom-dead-center (BDC) refers to the piston 18 for that cylinder 16 being at the bottom of its stroke, while top-dead-center (TDC) refers to the piston 18 being at the top of its stroke. While the intake valve 30, exhaust valve 32 and charging valve 36 opening and closing timings are shown at discrete locations for the various engine operating conditions, with the variable timing valves, this is more of a continuum between these various conditions with the timings varying according to engine speed/load and other operating conditions.

FIGS. 5A and 5B illustrate the poppet valve timing for an engine idle condition. During engine idle conditions, it is desired to have the overlap between the intake and exhaust valve open conditions within each cylinder 16 small in order to minimize the residual gas fraction. Intake valve opening 102 begins in the exhaust stroke just prior to piston TDC and closing 104 is shortly after TDC in the intake stroke. This air intake event is short in order to trap only a small volume of air in the cylinder 16, thus generally avoiding the need for air throttling. The exhaust valve opening 106 occurs during the combustion stroke just prior to BDC and remains open throughout the exhaust stroke, closing 108 just after TDC in the intake stroke. The charging valve 36 can be left closed, if so desired, as there is no need 32 for cooling of the charge in order to prevent knock. Consequently, a conventional Otto cycle takes place.

However, as illustrated in phantom in FIG. 5A, if turbulence in the cylinder is desired for improved fuel/air mixing, then the charging valve 36 and auxiliary chamber 40 can be employed. Charging valve opening 110 occurs before BDC in the intake stroke and closing 112 occurs just after BDC in the compression stroke. Thus, when it first opens, the contents of the auxiliary chamber 40 are drawn into the cylinder 16, and then before closing, some contents of the cylinder 16 are compressed back into the auxiliary chamber 40. Turbulence of the fuel/air mixture in the cylinder 16 generated by the auxiliary chamber 40 during compression will survive the compression cycle. In this way, the turbulence will improve the fuel/air mixing and provide for better combustion characteristics, thus improving fuel efficiency and emissions. So, if desired, the charging valve 36 can be active during the entire range of engine operating conditions.

Also of note with the engine idle condition is that the opening 110 and closing 112 of the charging valve 36 are close to BDC of the piston stroke, in this way, the air transferred into the auxiliary chamber 40 will not be under intense compression, thus minimizing the temperature increase of the air due to compression. The temperature difference between the air in the chamber and the coolant 44 will be small, minimizing the heat transfer from the air to the coolant. This is desirable since too low of a temperature for the cylinder content at combustion may not produce satisfactory combustion characteristics.

For very low idle conditions, there may be a desire for some throttling in order to assure some minimum temperature for the fuel/air mixture in the cylinder 16 at the time of combustion, due to the expansion of the fuel/air mixture during the second half of the intake stroke. However, since the engine is configured to operate with a higher overall effective compression ratio, the likely need for throttling is reduced since adequate combustion conditions can still be had. Again, with variable valve timing, the particular algorithm used by the on-board computer to determine when the charging valve is employed can be set to sometimes be actuated for a given speed/load condition or not depending upon other factors such as coolant temperature, cylinder temperature, amount of EGR, etc. Thus, the ability to operate at a high compression ratio has two advantages, not only does it improve the efficiency by improving the combustion characteristics, but it also allows for operation at lower idle speeds without the need for throttling, thus reducing pumping losses.

Further, the auxiliary chamber 40, which allows for the high compression ratio due to the intra-cycle cooling, also creates the turbulence which also improves efficiencies, and can use the same charging valve timing as the intra-cycle cooling under both partial and wide open throttle conditions. This turbulence will replace (or enhance) split port, tumble port, swirl and other turbulence generation devices to achieve fast combustion in spark ignition engines. Without the swirl or tumble generating devices, the intake air flow will be less constrained by the intake port. Therefore, the engine can achieve higher volumetric efficiency and produce higher power output for a given displacement engine.

FIGS. 6A and 6B show the timing for a light load engine condition. Again, for this operating condition, the charging valve 36 can be left closed as far as the need for cooling of the charge is concerned. Thus, a conventional Otto cycle can take place if so desired. The intake valve opening 202 is just before TDC and closing 204 is well before BDC on the intake stroke, although longer than with the idle condition in order to trap more air. The timing charts for FIGS. 6A and 6B will be identified with similar element numbers, except using 200 series numbers to indicate that the timing may have changed. In this way, again, the engine can again be run at part load unthrottled, reducing the pumping losses. The exhaust valve opening 206 is slightly before BDC and remains open throughout the exhaust stroke. It also remains open part way into the intake stroke, closing at 208, in order to provide for internal EGR by pulling some exhaust gasses from the previous combustion event back into the particular cylinder 16.

Again, for turbulence generation reasons, the charging valve 36 can be employed for this low load condition. The timing of charging valve opening 210 and charging valve closing 212 will be similar to that for the idle operating condition. The concern here with poor combustion characteristics is less than with the engine idle condition since more air is drawn into the cylinder 16 during the intake stroke, and low temperatures within the cylinder are not as much of a concern.

FIGS. 7A and 7B illustrate the valve timing for a medium load engine operating condition. The timing for intake opening 302 and exhaust opening 306 is essentially the same as with the light load and idle engine conditions. But, the exhaust valve closing 308 is retarded to increase the intake and exhaust valve overlap and thus increase the residual gas quantity (exhaust), which helps to control nitrogen oxide (NOx) emissions. This avoids the need for an external exhaust gas recirculation (EGR) system. The timing of the intake valve closing 304 is also adjusted to later in the intake stroke in order to trap somewhat more air in the cylinder 16 than with the low load condition. The intake valve closure, of course, is continuously adjusted based upon the current speed/load requirements for the engine, much as a throttle valve is adjusted in a conventional engine. For this condition, then, the need for air throttling is also avoided.

For this medium load condition in a high compression ratio engine, one must assure that in spite of the high compression, the charge temperature at the end of the compression stroke is low enough to avoid knock. This is accomplished here by cooling part of the air charge. The air charge that enters the auxiliary chamber 40 is cooled. It is cooled after partial compression in the cylinder 16 when its temperature is high enough to assure efficient heat transfer to the cooling agent 44, which is more efficient than trying to cool the air charge before it enters the cylinder 16.

To accomplish this, the charging valve opening 310 occurs just before BDC during the intake stroke and closing 312 occurs well into the compression stroke, assuring that the temperature in the auxiliary chamber 40 is sufficient for effective cooling. In the next cycle, near the end of the intake stroke, the charging valve 36 again opens and the cylinder 16 is supercharged with air from the auxiliary chamber 40, which mixes with the rest of the cylinder content. After pressure equalization, part of the cylinder content is again compressed into the auxiliary chamber 40 for subsequent cooling.

Consequently, the heat content of the air charge that remains in the cylinder 16 at the time of combustion is reduced since it contains a fraction from which a certain amount of heat was removed. In this process, then, a cooling charge of air circulates back and forth between the cylinder 16 and the auxiliary chamber 40 each cycle, mixing with the cylinder air and carrying away excess heat from the intake charge. Knock is avoided compared to a conventional engine if the heat extracted from the auxiliary chamber 40 cancels out the additional heat associated with increased compression ratio. Further, the geometry of the auxiliary chamber 40 and charging valve port 34 assure a turbulent mixture of air/fuel, still assuring good combustion characteristics.

FIGS. 8A and 8B illustrate a heavy load, low speed engine condition. For further efficiency gains, the intake valve closing 404 is late, beyond BDC into the compression stroke to increase the quantity of intake air trapped in the cylinder 16. During this engine heavy load, low speed condition it is desired to have the intake and exhaust valve overlap reduced by exhaust valve closing 408 taking place immediately after TDC.

For the charging valve 36, during the compression stroke at heavy load, low speed operation, charging valve opening 410 occurs early in the compression stroke just before intake valve closing 404. Part of the cylinder charge is then compressed through the open charging valve 36 into the auxiliary chamber 40 where it is subjected to the intense swirling motion. The charging valve closing 412 occurs late in the compression stroke, to maximize compression in the auxiliary chamber 40, before the start of combustion.

This late closure assures that the air in the auxiliary chamber 40 is under a significant amount of compression, thus raising its temperature. The high temperature differential between the swirling hot air inside the auxiliary chamber 40 and the coolant 44 outside contributes to efficient heat transfer. Consequently, the compressed hot air trapped in the auxiliary chamber 40 is subjected to intense cooling during the rest of the cycle (intra-cycle cooling). In the next cycle, when the charging valve opening 410 occurs, the cylinder 16 is supercharged with air from the auxiliary chamber 40, which mixes with the rest of the cylinder content. After pressure equalization, part of the cylinder content is again compressed into the auxiliary chamber 40. This prevents knock in spite of the high compression ratio. Again, this cooling of a portion of the charge permits running the engine with a much higher compression ratio than is possible with a conventional Otto cycle, thus allowing for increased power output from the engine.

FIGS. 9A and 9B illustrate a heavy load, high speed engine condition. This engine condition has similar valve timing to the heavy load, low speed engine condition except that intake valve closing 504 occurs farther into the compression stroke in order to take advantage of an intake air ram charging effect in order to maximize the volume of air received within the cylinder each cycle. As a result, the charging valve opening 510 is delayed somewhat to account for the later intake valve closing 504. The charging valve closing 512 is late to assure high compression in the auxiliary chamber 40. Also, since the conventional turbulence generation devices do not need to be employed, the maximum air flow and hence power output is assured.

While certain embodiments of the present invention have been described in detail, those familiar with the art to which this invention relates will recognize various alternative designs and embodiments for practicing the invention as defined by the following claims.

We claim:

1. A four stroke, spark ignition engine comprising:
   a cylinder block provided with at least one cylinder therein;
   a head, mounted to the cylinder block, including for each respective cylinder an intake port, an exhaust port and a charging port in communication with the cylinder;
   a piston operatively engaging the at least one cylinder, with the piston to cylinder and head relationship being such that a high compression ratio within the cylinder will be achieved during engine operation;
   an intake valve for each intake port, operatively engaging the respective intake port;
   an exhaust valve for each exhaust port, operatively engaging the respective exhaust port;
   a charging valve for each charging port, operatively engaging the respective charging port;
   an auxiliary housing including a main chamber enclosed therein and an opening from the main chamber in communication with the charging port, with the main chamber shaped in a generally circular shape and the opening being offset from a central portion of the main chamber whereby fluid entering the chamber will be caused to swirl about the chamber, and with the auxiliary housing also including a cooling jacket surrounding a portion of the main chamber;
   valve actuating means for selectively and variably actuating the intake valve and the exhaust valve in timed relation to engine operation; and
   charging valve actuating means for selectively and variably actuating the charging valve in timed relation to engine operation.

2. The engine of claim 1 wherein the high compression ratio, formed by the piston to cylinder and head relationship, is between 10:1 and about 15:1 whereby the engine will operate on regular octane fuel without knock.

3. The engine of claim 1 wherein the head includes an enclosed bore and chamber for each charging valve; each of the charging valves includes a valve piston coupled thereto shiftable within the respective enclosed bore and chamber thereby forming first and second cavities in each chamber that vary in volume as the charging valve moves; and the charging valve actuating means include a high pressure source of fluid and a low pressure source of fluid, a high pressure line extending within the cylinder head between the first and second cavities and the high pressure source of fluid and a low pressure line extending between the first cavity and the low pressure source of fluid, a high pressure valve and a low pressure valve for respectively regulating the flow of fluid in the first cavity, and a computer cooperating with the high and low pressure valves for selectively coupling the first cavity to the high pressure and low pressure sources.

4. The engine of claim 3 wherein the head includes an enclosed bore and chamber for each intake valve; each of the intake valves includes a valve piston coupled thereto shiftable within the respective enclosed bore and chamber thereby forming first and second cavities in each chamber that vary in volume as the intake valve moves; and the intake valve actuating means include a high pressure source of fluid and a low pressure source of fluid, a high pressure line extending within the cylinder head between the first and second cavities and the high pressure source of fluid and a low pressure line extending between the first cavity and the low pressure source of fluid, a high pressure valve and a low pressure valve for respectively regulating the flow of fluid in the first cavity, and the computer cooperating with the high and low pressure valves for selectively coupling the first cavity to the high pressure and low pressure sources.

5. The engine of claim 4 wherein the head includes an enclosed bore and chamber for each exhaust valve; each of the exhaust valves includes a valve piston coupled thereto shiftable within the respective enclosed bore and chamber thereby forming first and second cavities in each chamber that vary in volume as the exhaust valve moves; and the exhaust valve actuating means include a high pressure source of fluid and a low pressure source of fluid, a high pressure line extending within the cylinder head between the first and second cavities and the high pressure source of fluid and a low pressure line extending between the first cavity and the low pressure source of fluid, a high pressure valve and a low pressure valve for respectively regulating the flow of fluid in the first cavity, and the computer cooperating with the high and low pressure valves for selectively coupling the first cavity to the high pressure and low pressure sources.

6. The engine of claim 1 further including a computing means for controlling the timing of the valve actuating means and the charging valve actuating means thereby controlling the timing of the opening and closing of the intake valve, exhaust valve, and charging valve.

7. The engine of claim 1 wherein the head includes an enclosed bore and chamber for each intake valve; each of the intake valves includes a valve piston coupled thereto shiftable within the respective enclosed bore and chamber thereby forming first and second cavities in each chamber that vary in volume as the intake valve moves; and the intake valve actuating means include a high pressure source of fluid and a low pressure source of fluid, a high pressure line extending within the cylinder head between the first and second cavities and the high pressure source of fluid and a low pressure line extending between the first cavity and the low pressure source of fluid, a high pressure valve and a low pressure valve for respectively regulating the flow of fluid in the first cavity, and a computer cooperating with the high and low pressure valves for selectively coupling the first cavity to the high pressure and low pressure sources.

8. The engine of claim 1 wherein the head includes an enclosed bore and chamber for each exhaust valve; each of the exhaust valves includes a valve piston coupled thereto shIftable within the respective enclosed bore and chamber thereby forming first and second cavities in each chamber that vary in volume as the exhaust valve moves; and the exhaust valve actuating means include a high pressure source of fluid and a low pressure source of fluid, a high pressure line extending within the cylinder head between the first and second cavities and the high pressure source of fluid and a low pressure line extending between the first cavity and the low pressure source of fluid, a high pressure valve and a low pressure valve for respectively regulating the flow of fluid in the first cavity, and a computer cooperating with the high and low pressure valves for selectively coupling the first cavity to the high pressure and low pressure sources.

9. The engine of claim 1 further including a fuel injector mounted in each intake port.

10. The engine of claim 1 wherein the cylinder block further includes a water jacket surrounding a portion of each of the cylinders, with a liquid coolant contained therein, and wherein the cooling jacket of the auxiliary chamber contains the same liquid coolant therein as the water jacket.

11. The engine of claim 1 wherein the cylinder block is provided with four cylinders, the head is provided with four charging ports, one each communicating with each of the four cylinders, and four auxiliary housings are provided, each housing including a main chamber with an associated opening in communication with a respective one of the charging ports.

12. The engine of claim 1 wherein charging valve actuating means further include means for deactivating the charging valve for certain engine operating conditions.

13. A four stroke, spark ignition, high compression, internal combustion engine comprising:

a cylinder block provided with at least one cylinder therein;

a head, mounted to the cylinder block, including for each respective cylinder an intake port, an exhaust port and a charging port in communication with the cylinder;

a piston operatively engaging the at least one cylinder, with the piston to cylinder and head relationship being such that a high compression ratio within the cylinder will be achieved during engine operation;

an intake valve for each intake port, operatively engaging the respective intake port;

an exhaust valve for each exhaust port, operatively engaging the respective exhaust port;

a charging valve for each charging port, operatively engaging the respective charging port;

an auxiliary housing including a main chamber enclosed therein and an opening from the main chamber in communication with the charging port, with the main chamber shaped in a generally circular shape and the opening being offset from a central portion of the main chamber whereby fluid entering the chamber will be caused to swirl about the chamber, and with the auxiliary housing also including a cooling jacket surrounding a portion of the main chamber;

electrohydraulic valve actuating means, for selectively and variably actuating the intake valve and the exhaust valve in timed relation to engine operation; and charging valve actuating means for selectively and variably actuating the charging valve in timed relation to engine operation, and deactivating the charging valve for certain engine operating conditions.

14. The engine of claim 13 further including a computing means for controlling the timing of the valve actuating means and the charging valve actuating means thereby controlling the timing of the opening and closing of the intake valve, exhaust valve, and charging valve.

15. The engine of claim 14 wherein the high compression ratio, formed by the piston to cylinder and head relationship, is between 10:1 and about 15:1 whereby the engine will operate on regular octane fuel without knock.

16. The engine of claim 15 further including a fuel injector mounted in each intake port.

17. The engine of claim 16 wherein the cylinder block further includes a water jacket surrounding a portion of each of the cylinders, with a liquid coolant contained therein, and wherein the cooling jacket of the auxiliary chamber contains the same liquid coolant therein as the water jacket.

18. The engine of claim 17 wherein the cylinder block is provided with four cylinders, the head is provided with four charging ports and associated charging valves, one each communicating with each of the four cylinders, and four auxiliary housings are provided, each housing including a main chamber with an associated opening in communication with a respective one of the charging ports.

19. The engine of claim 18 wherein the head includes an enclosed bore and chamber for each of the four charging valves; each of the charging valves includes a valve piston coupled thereto shiftable within the respective enclosed bore and chamber thereby forming first and second cavities in each chamber that vary in volume as the charging valve moves; and the charging valve actuating means include a high pressure source of fluid and a low pressure source of fluid, a high pressure line extending within the cylinder head between the first and second cavities for each of the charging valves and the high pressure source of fluid and a low pressure line extending between the first cavity and the low pressure source of fluid for each of the charging valves, a high pressure valve and a low pressure valve for each of the charging valves, respectively, with each regulating the flow of fluid in the corresponding first cavity, and a computer cooperating with the high and low pressure valves for selectively coupling the first cavities to the high pressure and low pressure sources.

* * * * *